F. J. KIMBALL,
Assignor to the Empire Transportation Co.
METAL CAR-FRAME.
No. 7,730.
Reissued June 12, 1877.
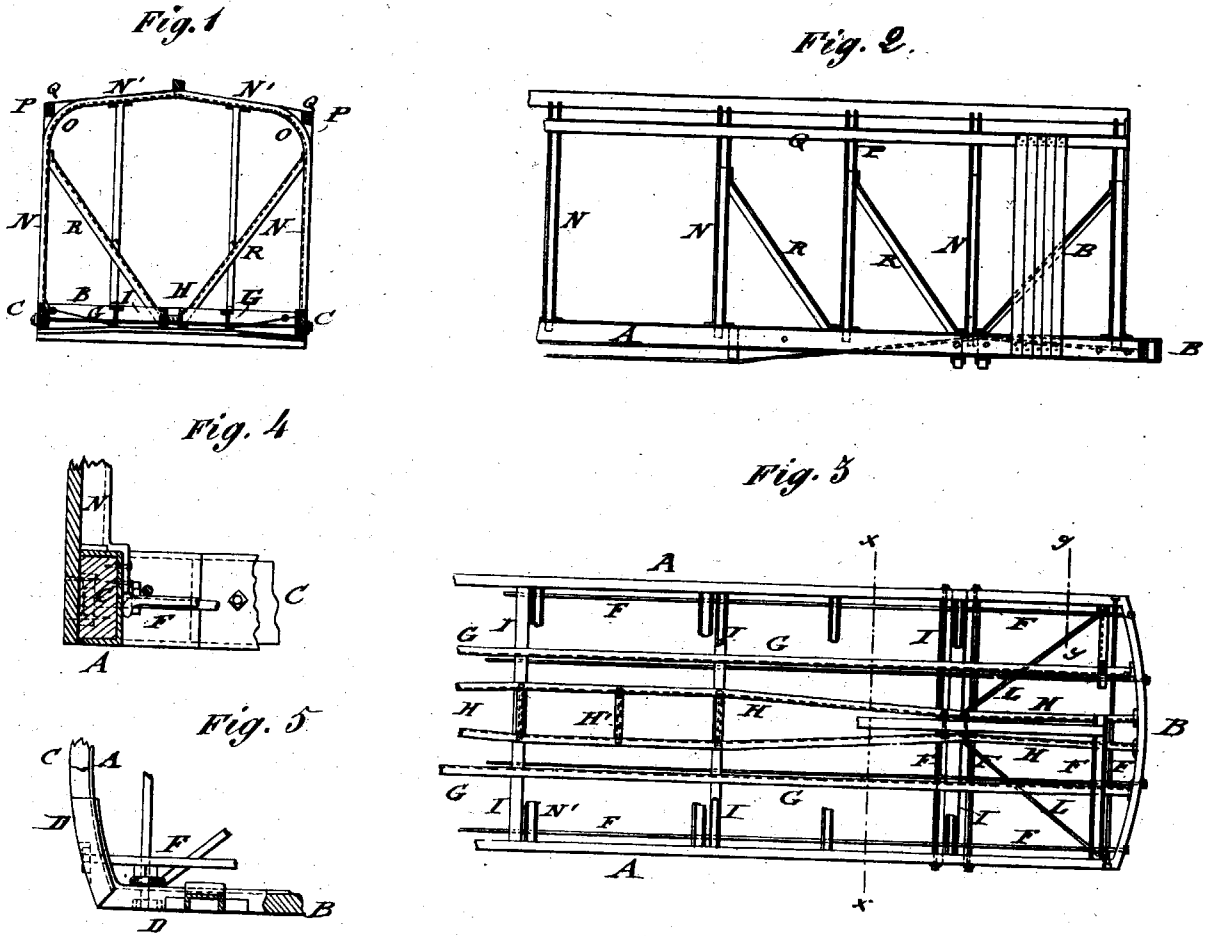
WITNESSES:
C. Neveux
J. H. Scarborough
INVENTOR:
F. J. Kimball.
BY Munn & Co
ATTORNEYS.

UNITED STATES PATENT OFFICE.

FREDERICK J. KIMBALL, OF PHILADELPHIA, PENNSYLVANIA, ASSIGNOR TO THE EMPIRE TRANSPORTATION COMPANY, OF SAME PLACE.

IMPROVEMENT IN METAL CAR-FRAMES.

Specification forming part of Letters Patent No. 183,856, dated October 31, 1876; reissue No. 7,730, dated June 12, 1877; application filed February 10, 1877.

*To all whom it may concern:*

Be it known that I, FREDERICK J. KIMBALL, of Philadelphia, in the county of Philadelphia and State of Pennsylvania, have invented a new and Improved Metal Car-Frame, of which the following is a specification:

This invention relates to a novel, durable, and strong construction of metal car-frames; and consists of metal side and end bars, of suitable cross-section, filled with wooden stiffening-pieces, and connected at the corners by knee-pieces and longitudinally and transversely by metal bars. The arched metal standards are braced in suitable manner, and provided with angular corner-pieces of wood, to attach the roof and sheathing. The middle longitudinal bars have an outward bow or set and suitable stays, as will be more fully described.

In the accompanying drawing, Figure 1 represents a vertical transverse section of my improved metal car-frame, taken on line *x x*, Fig. 3. Fig. 2 is a side elevation; Fig. 3, a plan view, partly in section. Fig. 4 is a detail vertical transverse section of the side bar or beam on line *y y*, Fig. 3; and Fig. 5, a detail top view of the knee-connection of the side and end beams.

Similar letters of reference indicate corresponding parts.

A in the drawing represents the side bars or beams, and B the lateral end pieces, of the bed-frame of my improved car-frame, said bars being made of channel-iron. They are so placed that the cavity or space of the bars is at the outside, the space being filled with wooden pieces C, which serve to stiffen the metal, being also used for the purpose of nailing or otherwise fastening the sides of the car thereto.

The ends of the side and end bars A and B are connected at the corners by metal knee-pieces D, which form strong joints by riveting or bolting the bars to them, the bars being seated in the knee-pieces and rigidly secured thereto. Through these metal corner-pieces longitudinal and transverse rods or bolts F are arranged for straining the frame up tight.

The end pieces of the bed-frame are longitudinally connected by side bars or beams G of any suitable cross-section, and by central bars H, which are placed symmetrically to the center axis between the outer bars G, and slightly curved outward, as shown in Fig. 3, being attached to the end bars B by flanges and rivets, and supported at suitable intervals on the transverse brace-bars I, which are attached to the side bars A, and arched somewhat at the middle portions for strength.

The longitudinal bars H are stiffened by lateral stays H′ at suitable intervals, for greater strength.

From the corners of the bed-frame to the junction of the first brace-bars I with middle longitudinal bars H extend diagonal braces L, that are intended to stiffen up the bed-frame.

The roof, side frame, and sheathing of the car is supported by and attached to bars that form uprights N, rounded-off corners O, and the arched or inclined top pieces N′. Corner-pieces P, of wood, are secured to the uprights N and top pieces N′, for producing the angular outer shape of the car and supporting the longitudinal wooden corner-beams Q. A ridge-plate is also supported by the top pieces N along the middle, while the upright side pieces N are braced by angle-bars R, which are split along the angles at the ends, for being riveted to the top of bars A and side of pieces N.

The tension-rods F, running longitudinally, are arranged over the end transverse bars and under the middle ones, to brace up the middle of the car, as shown in Fig. 2. The upright side pieces N are secured to the side bars A by bottom flanges or extensions.

The bars H are curved on a horizontal plane, because the shock which occurs when the cars come together comes mainly upon the middle stringers, and when the strain is too great for the rods that pass through the thimbles, the said bars will readily spread, and can be afterward easily drawn back into place. If not curved, they might bend upward or downward, so that they could not be straightened without removal from the car-frame.

Having thus described my invention, I claim as new and desire to secure by Letters Patent—

1. The combination of the side and end bars A B and connecting knee-pieces D with the longitudinal and transverse bars G, H, and I, substantially as specified.

2. The arched channel-standards and wooden corner-pieces, as shown and described.

3. The middle longitudinal bars H, having the outward bow or set, and provided with suitable stays H′, as and for the purpose described.

FREDERICK JAMES KIMBALL.

Witnesses:

JNO. H. SCOTT, Jr.,

H. F. GORIN.